United States Patent [19]

Nimpoeno et al.

[11] Patent Number: 4,895,326
[45] Date of Patent: Jan. 23, 1990

[54] IN-DASH INSTALLATION KIT ADAPTABLE TO DIFFERENT RADIOS AND DIFFERENT DASH CONFIGURATIONS

[75] Inventors: Roy Nimpoeno, Northridge; Rober J. Alves, Simi Valley, both of Calif.

[73] Assignee: Scosche Industries, Inc., Moorpark, Calif.

[21] Appl. No.: 319,114

[22] Filed: Mar. 6, 1989

Related U.S. Application Data

[63] Continuation-in-part of Ser. No. 199,797, May 27, 1988.

[51] Int. Cl.$^4$ ................................................. G12B 9/00
[52] U.S. Cl. .................................. 248/27.1; 248/544; 248/558; 312/7.1; 455/345
[58] Field of Search ....................... 248/27.1, 27.3, 544, 248/558, 551, DIG. 9, 298; 312/242, 296, 328, 7.1, 257 A; 455/345

[56] References Cited

U.S. PATENT DOCUMENTS

| | | | |
|---|---|---|---|
| 2,328,421 | 8/1943 | Carlson | 248/DIG. 9 X |
| 3,454,251 | 7/1969 | Dye | 248/354.5 |
| 4,067,654 | 1/1978 | Maniaci | 403/4 |
| 4,462,564 | 7/1984 | Alves et al. | 312/7.1 X |
| 4,660,789 | 4/1987 | Putnam | 248/27.3 |
| 4,699,341 | 10/1987 | Ponticelli | 248/27.1 |
| 4,738,420 | 4/1988 | Angle et al. | 248/544 X |

FOREIGN PATENT DOCUMENTS 1604014  12/1981  United Kingdom .................... 403/4

Primary Examiner—David L. Talbott
Attorney, Agent, or Firm—William W. Haefliger

[57] ABSTRACT

An in-dash radio installation kit, for installing a radio to a vehicle dash, comprises:
  (a) a box-like molded plastic frame including walls comprising end walls and a main front panel interconnecting the end walls,
  (b) the end walls having re-entrant recesses formed therein, with inner surface that are forwardly elongated,
  (c) and through openings in the end walls for reception of connectors that connect the end walls to the radio chassis received between the end walls, with connector heads retained in the recesses and connector shanks passing through the openings. Brackets are attachable to the end walls via holes in the end walls above, arranged in rows above and below the re-entrant recesses, so that the brackets vertically bridge the re-entrant recesses and are selectively attachable to the end walls, forwardly and rearwardly.

18 Claims, 7 Drawing Sheets

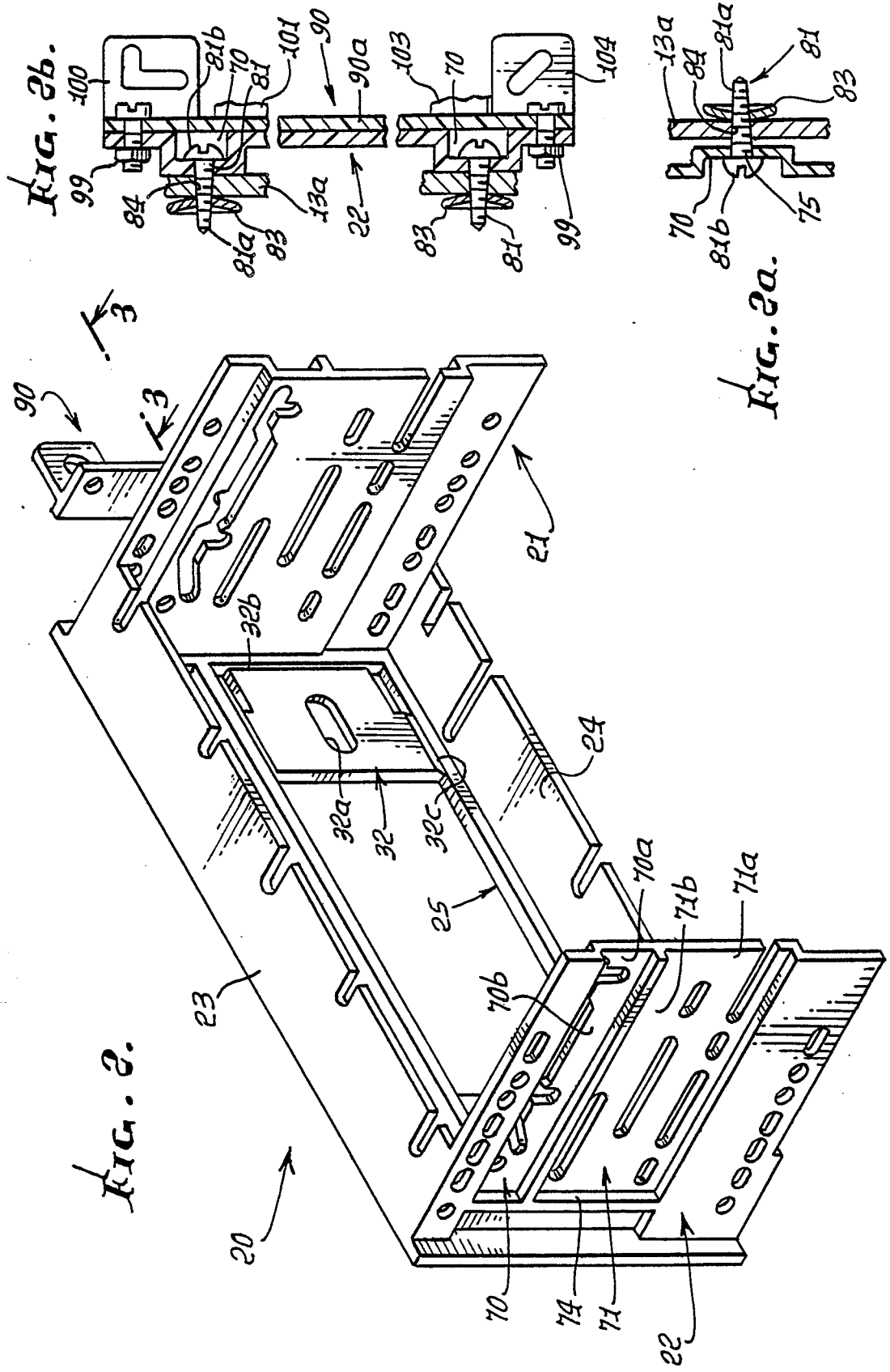

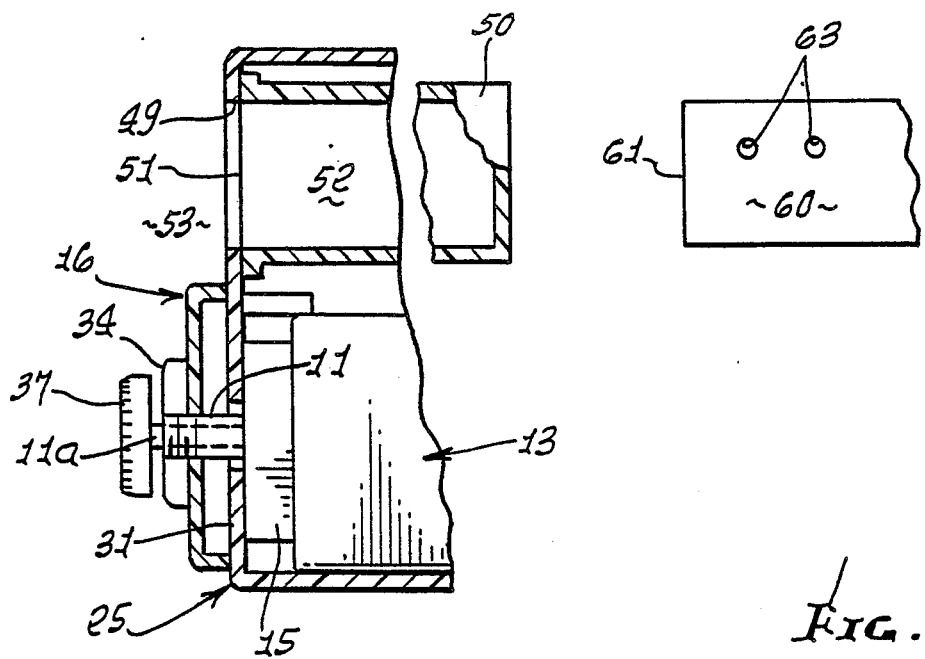
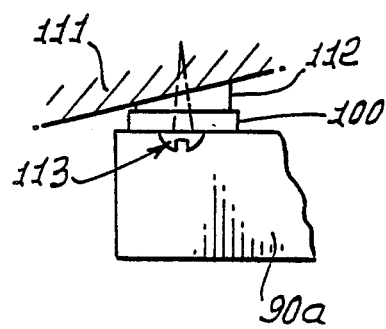
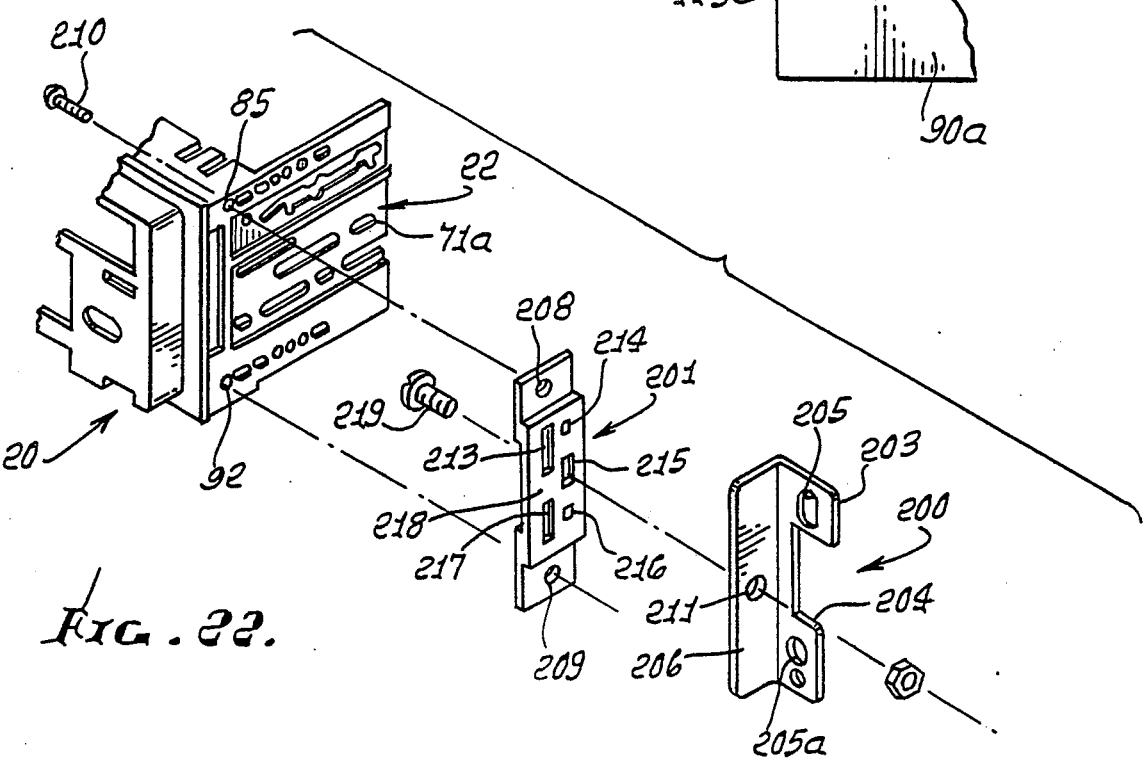

IN-DASH INSTALLATION KIT ADAPTABLE TO DIFFERENT RADIOS AND DIFFERENT DASH CONFIGURATIONS

BACKGROUND OF THE INVENTION

This application is a continuation-in-part of Ser. No. 199,797 filed May 27, 1988.

This invention relates to a conversion kit to facilitate the mounting of substitute equipment such as a radio, or equalizer in an automatic instrument panel, such equipment substituted for the original equipment radio.

It has become quite common in the contemporary automobile market for owners to want to substitute for the original equipment radio, (or dummy panel when the car comes equipped without a radio), that is in the car when new, a radio of a different type. Typically, the original equipment radio is mounted to install in a cavity in the instrument panel of the automobile, with a trim frame or panel around the control panel of the radio.

Present day automobiles differ in style and appearance including the size and location of the cavity in which the radio is installed. Conversion kits have been available wherein a frame is inserted into the cavity after the radio. However, a large assortment of different conversion kits is necessary in order to fill the requirements of different automobiles having different instrument panel designs.

Thus, there is a strong need in the art for a conversion kit having the capability of serving its purpose in a large variety of different automobiles especially to convert to use of a DIN radio and/or equalizer (tone control) chassis.

SUMMARY OF THE INVENTION

It is a major object of the invention to provide a simple yet universal conversion kit, which will meet the above need. Basically, the invention is embodied in a device which comprises:

(a) a box-like, molded plastic frame having wall means including end walls and a main front panel interconnecting the end walls, (b) the end walls having re-entrant recesses formed therein, said recesses having inner surfaces which are forwardly elongated, (c) and through openings in said end walls for reception of connectors that connect the end walls to the chassis received between said end walls, with connector heads then retained in said recesses and connector shanks passing through said openings.

As will be seen, the main front panel typically has a front face, and break-away means may be provided to comprise a thin wall or walls generally parallel to the front face.

It is another object of the invention to provide a front sub-panel overlying the break-away means and having a front face substantially flush with the front face of the main front panel, the sub-panel also forming forward through openings in shaft passing registration with the through openings in the break-away means, the sub-panel rearwardly carried by the frame.

Another object is to provide a front panel and end walls for reception of an auxiliary chassis or frame which may be defined by one of the following:

(a) a radio equalizer chassis
(b) a storage compartment.

It is a further object to provide the end walls of the frame with multiple forwardly and rearwardly extending re-entrant recesses that receive the heads of connectors for connecting the end walls to a chassis received between the end walls. Forwardly elongated through openings intersect the inner surface of the re-entrant recesses for receiving the connector shafts in adjustable relation. Circular holes are also provided above and below the re-entrant recesses for attaching to brackets that vertically bridge the re-entrant recesses. The brackets can be selectively positioned with bracket openings registered over selected holes in the end walls to interfit and connect different vehicle dash structures. The brackets carry break-away tabs, of different types, for selective attachment to different dash structures.

The invention is especially adapted to mounting DIN radios to GM vehicles, and as replacements for radios in such vehicles.

These and other objects and advantages of the invention, as well as the details of an illustrative embodiment, will be more fully understood from the following specification and drawings in which:

DRAWING DESCRIPTION

FIG. 2 is a rear perspective view of the frame after removal of the break-away means, for reception of the DIN-radio;

Figure 3:
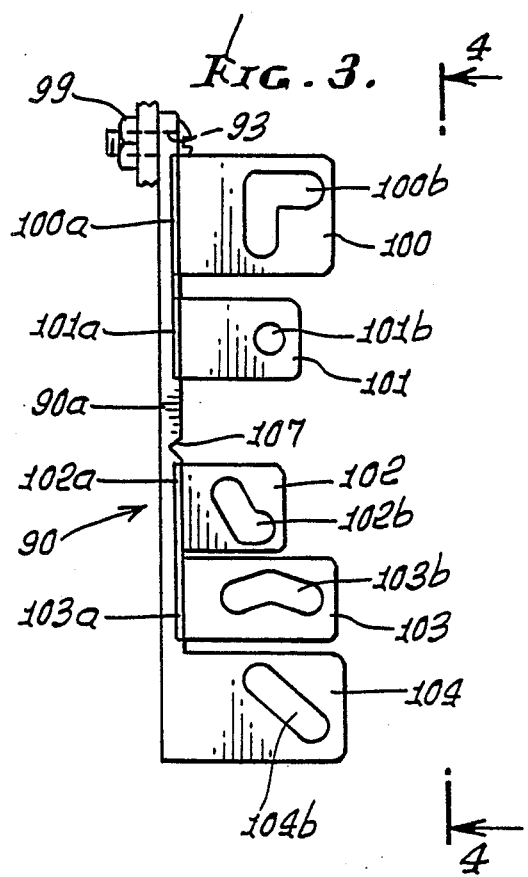
Figure 4:
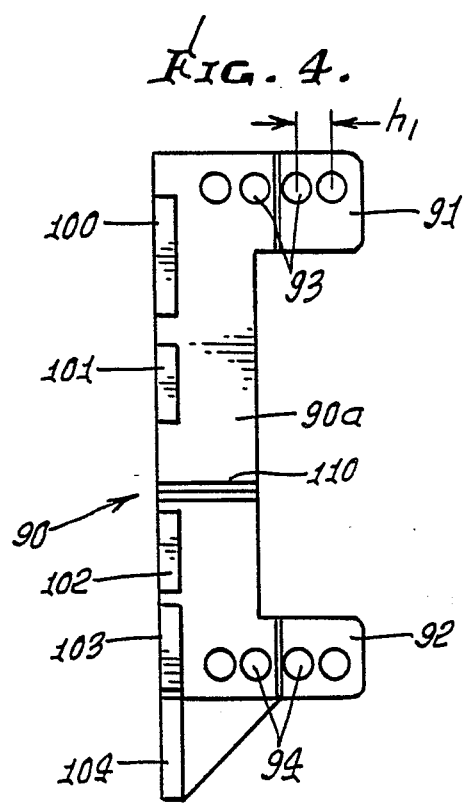
Figure 6:
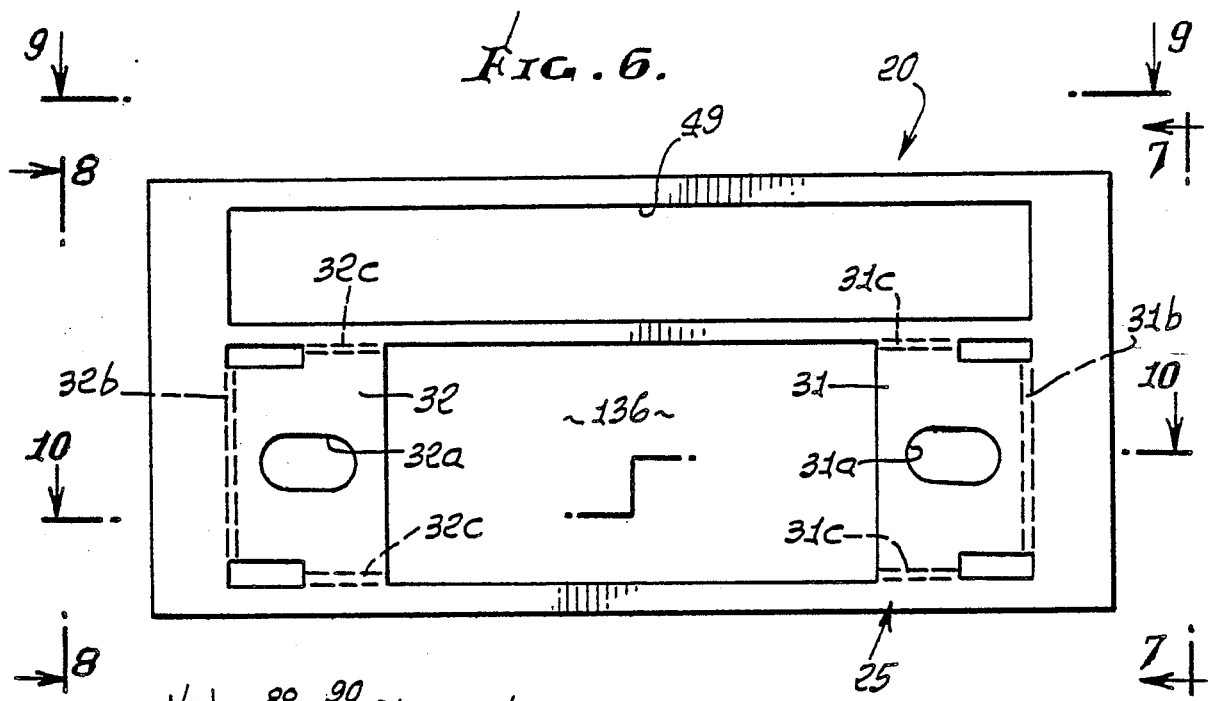
Figure 7:
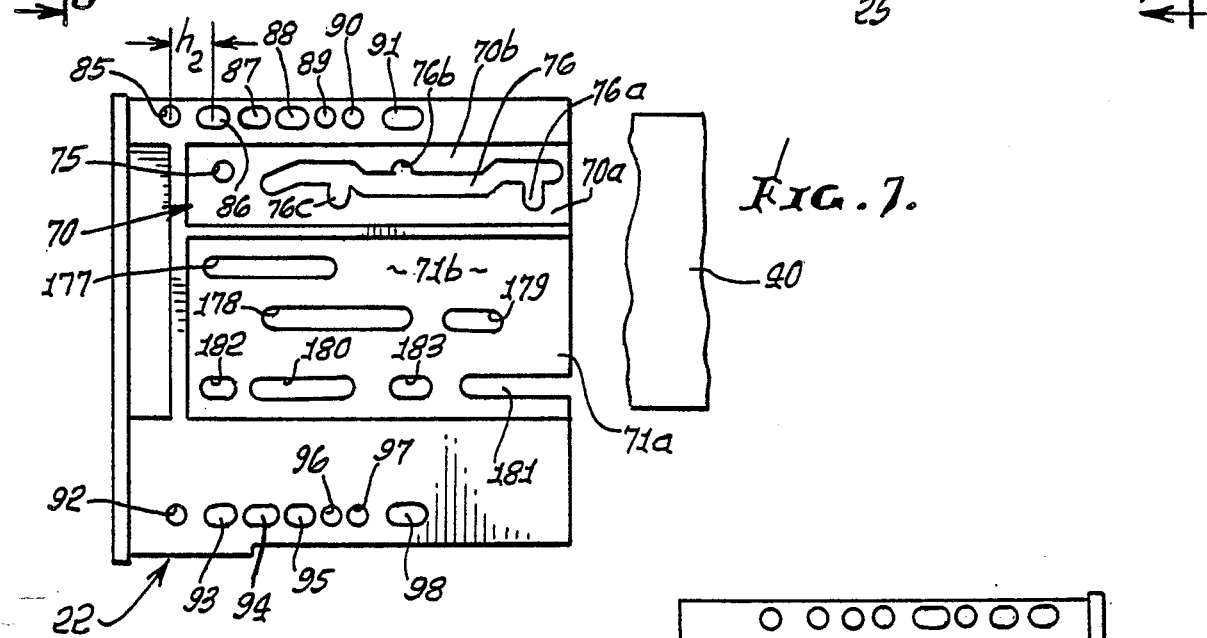
Figure 8:
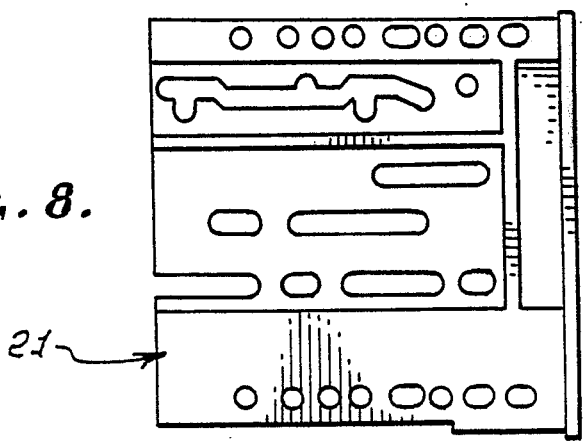
Figure 9:
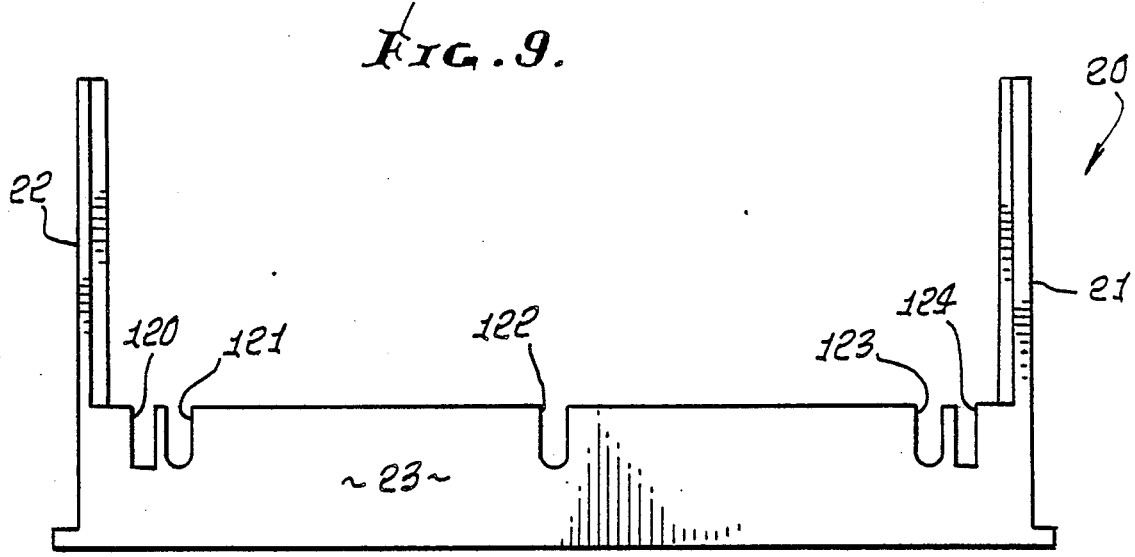
Figure 10:
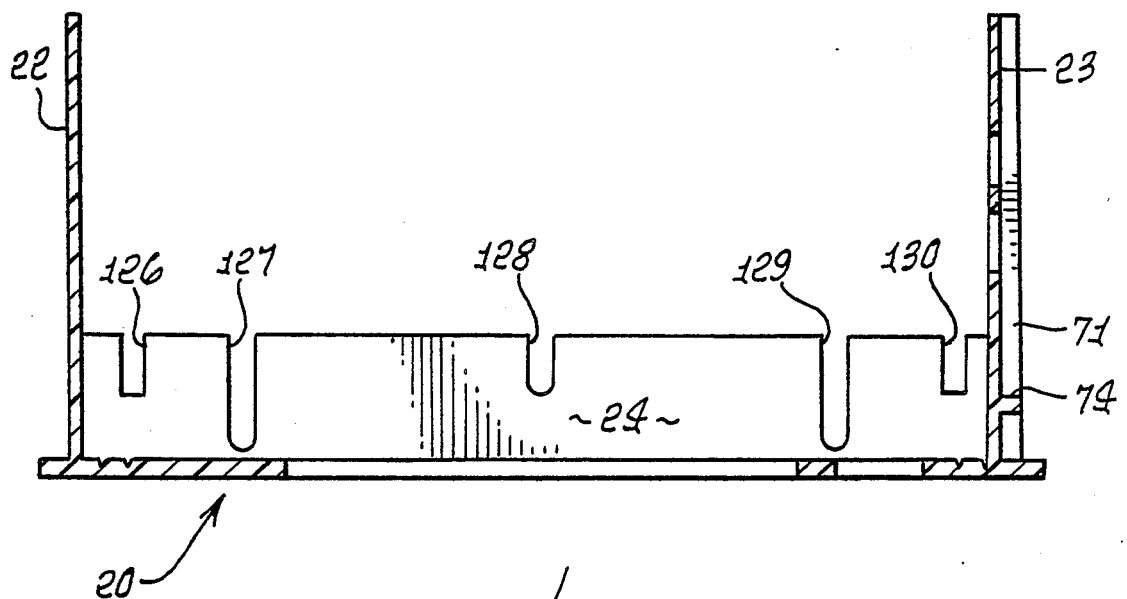
Figure 11:
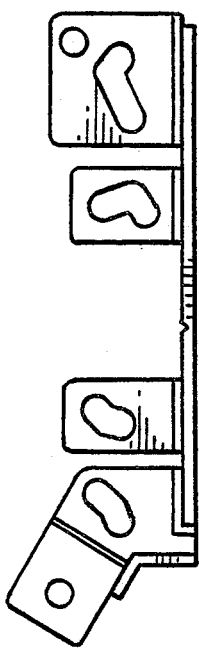
Figure 12:
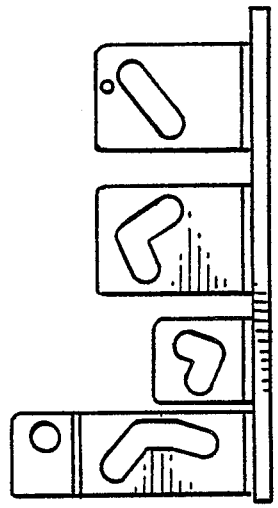
Figure 14:
Figure 15:
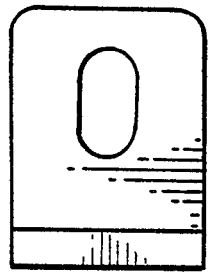
Figure 13:
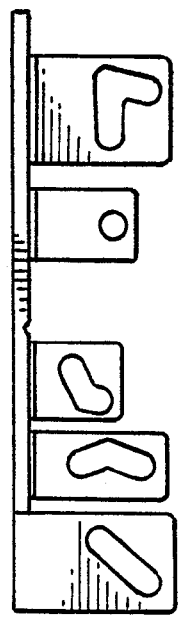
Figure 16:
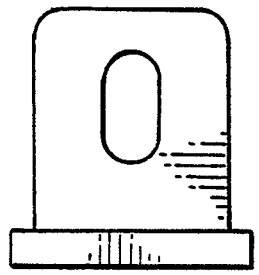
Figure 17:
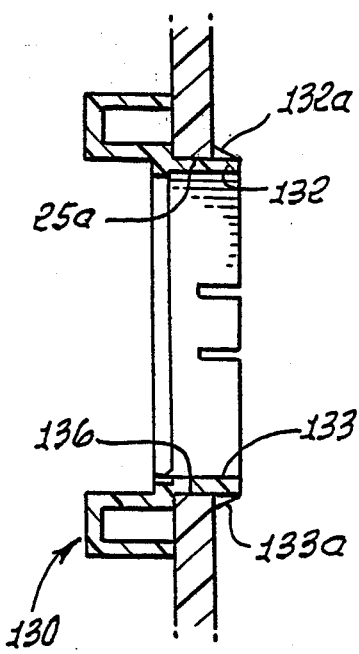
Figure 18:
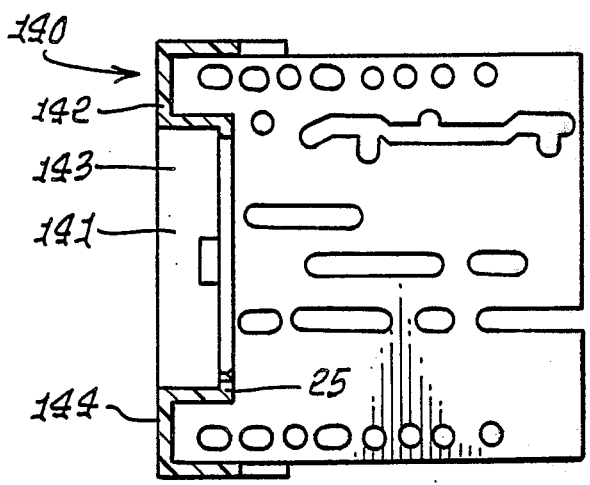
Figure 19:
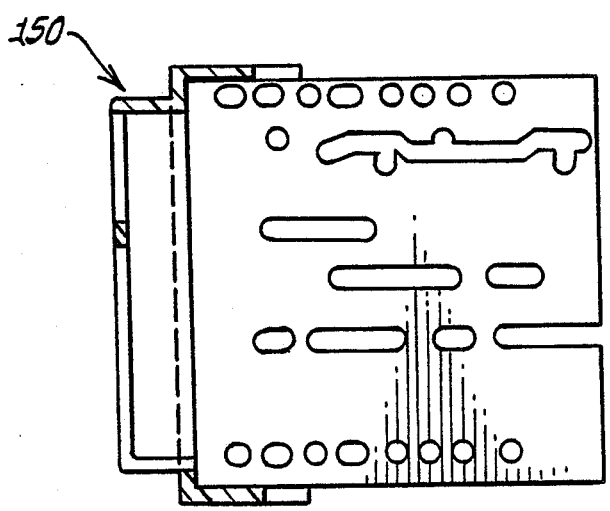
Figure 20:
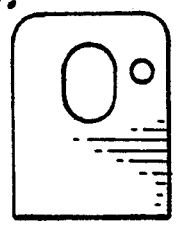
Figure 21:
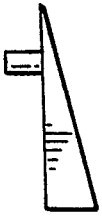

FIG. 2a fragmentary section;

FIG. 2b is a more complete elevation, in section;

FIG. 3 is an elevation showing details of a bracket, and taken on lines 3—3 of FIG. 2;

FIG. 4 is an elevation taken on lines 4—4 of FIG. 3;

FIG. 5 is a fragmentary view showing attachment of a selected tab of the FIGS. 3 and 4 bracket to vehicle structure, as via a wedge;

FIG. 6 is a front elevation of the unit seen in FIG. 2;

FIG. 6a is a vertical section showing face plate connection to the frame;

FIG. 7 is a right side view taken on lines 7—7 of FIG. 6;

FIG. 8 is a left side view taken on lines 8—8 of FIG. 6;

FIG. 9 is a top plan view taken on lines 9—9 of FIG. 6;

FIG. 10 is a section taken on lines 10—10 of FIG. 6;

FIGS. 11–16 are elevations showing different bracket tab configurations for different vehicle dash structures;

FIG. 17 is a section showing a "snap-in" extension panel basic frame;

FIG. 18 is a vertical section showing an integral front on the basic frame;

FIG. 19 is a vertical section showing another front panel configuration;

FIG. 20 is a front view of a wedge-type spacer;

FIG. 21 is a view taken on lines 21—21 of FIG. 20; and

Figure 1:
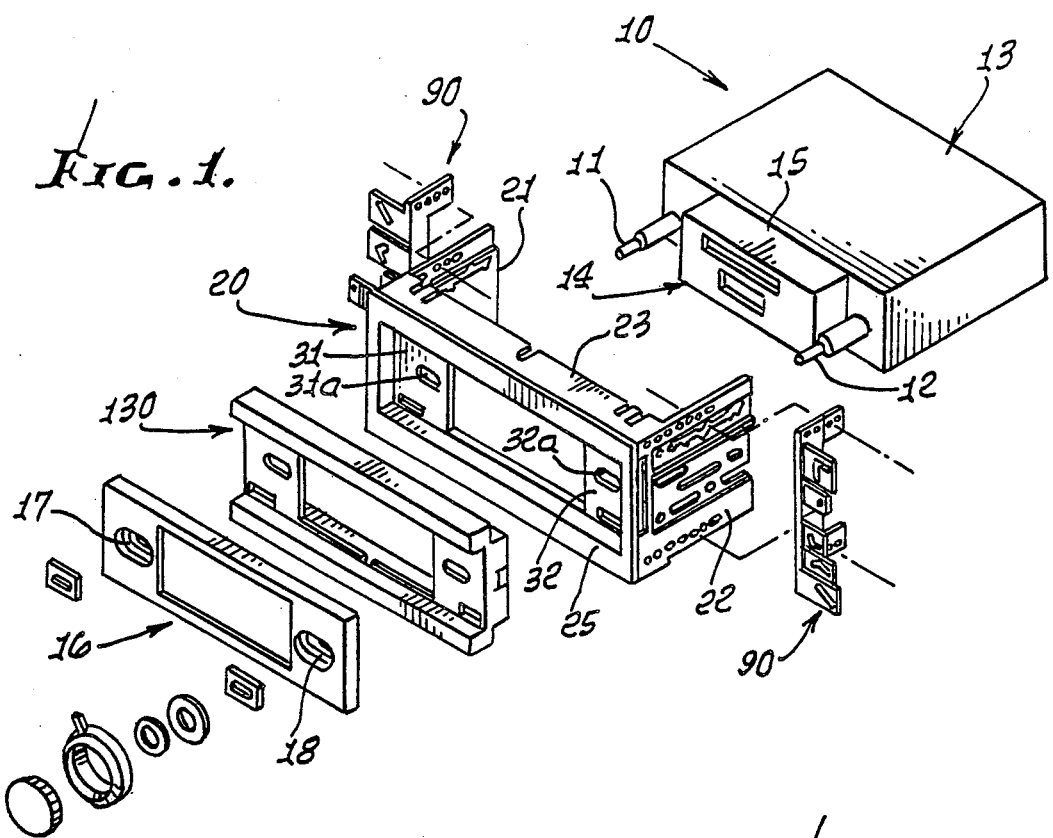
FIG. 1 is an exploded perspective view showing use of the box-like frame of the invention for reception of one type radio, and with break-away means in place.

FIG. 22 is a perspective view like FIG. 1 showing a bracket adapter and bracket connectible to a frame as seen in FIG. 1.

DETAILED DESCRIPTION

The assembly seen in FIG. 1 includes a vehicle dash mounted radio 10 (General Motors vehicle, for example) having tuning (station selection and volume control) shafts 11 and 12 projecting forwardly from the chassis 13, and at opposite ends of instrumentation 14 contained in a reduced size rectangular sub-housing 15.

The radio normally has a removable face plate provided with shaft-passing openings 17 and 18.

In accordance with the invention, a box-like, molded plastic housing or frame 20 is provided, and is rearwardly open for reception into the frame of the forward extent of chassis 13 The frame has wall means including upright relatively thin end walls 21 and 22, top and bottom walls 23 and 24, and a main front panel 25 interconnecting the walls 21-24, by integral molding to the forward ends of such walls. See panel 25 in FIGS. 2 and 6.

The housing also includes plastic break-away means, such as thin sub-walls 31 and 32 integral with the housing and associated with the front panel. The thin sub-walls form through openings 31a and 32a in registration with face plate openings 17 and 18 for passing the tuning shafts 11 and 12. FIG. 6a shows face-plate 16 connection to the front wall 25 of the frame. Plate 16 is clamped rightwardly by the nuts 34 threaded on shafts 11 and 12; and a tuning knob 37 is pressed on the end of a rotary inner shaft 11a passing through outer shaft 11 to a variable impedance (such as a variable capacitor) within chassis 13.

The break-away means such as sub-walls 31 and 32 can be broken away long edges 31b and 32b, and 31c and 32c in FIG. 6, whereby the front opening in the main front panel is enlarged for forward protrusion of the front wall of a larger chassis, i.e., for a DIN radio. (The opening is reduced in FIG. 6a to fittingly accept the sub-housing 15 of chassis 13.) Relieved upper and lower edges at 31c and 32c of each sub-wall assist such break-away. In FIG. 7 the enlarged opening fittingly accepts or registers with the larger chassis 40 of a DIN radio. Also, the DIN radio chassis typically projects through the enlarged opening and a DIN radio panel or front plate is then substituted for 16.

The front panel 25 also defines a generally rectangular through (access) opening 49 for registration with an auxiliary frame. In FIG. 6a, the auxiliary frame comprises a pocket or receptacle 50 which opens frontwardly at 51, so as to be manually accessible at 53 to the user for storage of small articles (keys, pencils, etc.) at 52.

Alternatively, and as seen in FIG. 6a, an equalizer chassis 60 registers with opening 49, and the front (instrument) face 61 of that chassis may project into or through the rectangular access opening 49. Fasteners extend through openings in the frame end walls nd into openings 63 in the side walls of chassis 60, to retain it in position. Such fasteners comprise tightenable, threaded fasteners.

In accordance with an important aspect of invention, the end walls 21 and 22 have re-entrant recesses forward therein, to extend forwardly and rearwardly, the recesses extending inwardly from the outer sides of the walls. The recesses thus have inner flat surfaces which are forwardly and rearwardly (see FIG. 2) elongated, and through openings in the end walls intersect those inner surfaces. See for example the two horizontally elongated re-entrant recesses 70 and 71 in each end wall, and which extend generally parallel with one another. Those recesses are rearwardly parallel with on another. Those recesses are rearwardly open at 70a and 71a, but their forward ends terminate at vertical wall 74, spaced rearwardly from front wall 25 of the frame. The recesses have inner surfaces 70b and 71b, as shown. The surface 70b is intersected by circular cross section opening 74 and forwardly elongated through opening 76 having side branches 76a, 76b and 76c, and the surface 71b intersected by through openings 177-181 which are forwardly elongated and short through openings 182 and 183. Each end wall 21 and 22 contains like recesses and openings, as described.

As seen for example in FIG. 2a, a typical opening 75 receives the shank 81a of a connector 81, the head 81b of which is received in re-entrant recess 70; and threaded shank 81a connects in the side wall 13a of a chassis 13, as via a nut 83. Forward elongation of the openings 76 and 177-181 permits relative forward and rearward accommodation of the frame to the chassis 13, upon assembly, the chassis having, for example, round openings 84 to pass the shanks 81a. The multiplicity of the recesses 70 and 71 accommodates attachment to different chassis 13 characteristic of aftermarket radios. See also FIG. 2b showing a bracket 90 attached to end wall 22, and in relation to connectors 81 and 99, and chassis wall 13a.

Other holes are provided through the side walls, for alignment with brackets to be fastened to the end walls 21 and 22, said brackets also adapted for attachment to vehicle dash structure of different configurations. See for example the upper forwardly elongated row of openings 85-90; and the lower forwardly and elongated row of openings 92-97, through each molded plastic end wall; also provided are forwardly elongated upper opening 91 in the upper row, and forwardly elongated lower opening 98, in the lower row. Such openings are adjustably alignable with brackets to be fastened to the end walls, the brackets also adapted for adjustable attachment to vehicle dash structure.

FIGS. 2—5 show typical molded plastic mounting brackets 90 as having L-shape in horizontal cross section, the bracket itself being upright and vertically elongated. Vertical arm 90a of the bracket has upper and lower legs 91 and 92, each containing at least two circular cross sections through apertures spaced apart forwardly and rearwardly for selective alignment of one of the apertures 93 in the upper arm, with one of the holes 85—91 in the end wall; and for selective alignment of one of the apertures 94 in the lower row with one of the holes 92-98 in the lower row in the end wall. Fasteners 99 are then attachable through each aperture, see FIG. 3, to selectively and forwardly and rearwardly adjustably attach the bracket 90 to the end wall, in bridging relation to the re-entrant recesses, as referred to. For additional adjustment, the center-to-center spacing "$h_1$" between successive apertures 93 is slightly different from (as for example less than) the effective center-to-center spacing "$h_2$" between successive of the holes 85-91, and the same is true with respect to apertures 94 as related to holes 92-98. Thus, a "vernier" (fine) adjustment is provided, enabling a wide range of adjustable and sturdy positioning of the bracket relative to the end wall, all without interference with the connectors that connect the end walls 21 and 22 of the chassis 13, the heads of such connectors being concealed in the re-entrant recesses. If desired, certain holes in each row seen in FIG. 7, such as holes 25, 89 and 90, may be circular, and adjacent non-circular (i.e. elongated) holes, such as 86, 87, 88, and 91, to even further accommodate to fit to a bracket having only circular holes, as in FIG. 4.

Further, the brackets include multiple tabs to be selectively usefully attached to vehicle dash structure, while remaining unselected and unused tabs as carried by the bracket to be broken away. See for example FIG. 3 showing tabs 100-104 associated with bracket arm 90b. The tabs extend in vertical sequence, and are separated by gaps 105-108, allowing individual break away of unused tabs, at reduced thickness break lines 100a-104a. The different configuration through openings 100b-104b in the tabs conform to corresponding attachment point openings in the dash structure of different vehicles. A reduced thickness "cut" line 110 across the arm 90a aligns with gap 107 for controlled breakage of the bracket into two sections either of which may be used individually, if desired. Note in FIG. 5 the connection of a tab 100 with dash structure 111, a wedge-shaped spacer 112 and a fastener 113 passing through 100 and 112 into 111. FIGS. 20 and 21 also show the wedge spacer. FIGS. 11—16 show other bracket configurations that are usable with the described frame to connect to different GM vehicle dash structures.

FIGS. 9 and 10 illustrate top and bottom walls 23 and 24 of the frame 20 having slots 120-124, and 126-130 therein, the slots being forwardly elongated to connect to vehicle dash or other mounting structure, as via appropriate brackets or fasteners. Thus, for example, slots 120, 124, 126, and 130 are to be used for mounting a factory radio mounting bracket to the kit with a carriage bolt and nut.

FIG. 17 is a session showing a forward extension panel 130 held adjacent front panel 25, as by attachment thereto. Panel 130 has rearwardly projecting cantilever arms 132 and 133, with rearwardly tapering ends 132a and 133a. Arms 132 and 133 bend inward as ends 132a and 133a cam against the portions 25a of the front panel bounding the opening 136 therein that passes the chassis extent 15, whereby the barbed ends 132a and 133a snap behind the panel 25, as shown.

FIG. 18 shows a forward extension panel 140 like that of FIG. 17 but integrally molded to front panel 25. The front extent 15 of the radio fits in space 141 between forward extension frame legs 142-144, and 145 (not shown, but parallel to 143). A similar forward extension panel is shown at 150, in FIG. 19.

The above frame walls 21 and 22 have thickness less than 1/16 inch, and the frame and brackets consist of molded plastic material.

FIG. 22 is a perspective view showing a factory bracket 200 and factory bracket adapter 201 connectible to the end wall 22 of the frame 20, as better seen in FIG. 1. A typical factory-supplied bracket 200 is vertically elongated and has L-shape in horizontal cross section along its length. Legs 203 and 204 have apertures 205 and 205a connectible to dash structure, and flange 206 has an aperture to mount to supported structure. In this case, the latter comprises the adapter bracket 201, which is also vertically elongated, with upper and lower apertures 208 and 209 for fasteners 210 to connect to the end wall 22 of the frame 20, as via holes 85 to 92 registering with apertures 208 and 209. An aperture 211 in leg 206 of the bracket 200 registers with one of the through openings 213-217 in the raised middle portion 218 of the bracket 201 to pass the shank of a carriage bolt 219, thereby attaching the bracket 200 to the frame 20. The head of the bolt fits in wall recess 71a underlying the raised portion 218. This structure permits forward and rearward fit adjustment of the frame 2 relative to the fixed position factory bracket 200.

FIGS. 11-15 show different bracket tab configurations for different vehicle dash structures. Such brackets with different tabs are identified at 300-302, and end view of typical tabs appear at 303-305.

We claim:

1. In an in-dash radio installation kit, for installing a radio chassis or radio associated device chassis to a vehicle, the improvement comprising:
   (a) a box-like, molded plastic frame having wall means including end walls and a main front panel interconnecting the side walls,
   (b) the end walls having re-entrant recesses formed therein, said recesses having inner surfaces which are forwardly elongated,
   (c) and through openings in said end walls for reception of connectors that connect the end walls to the chassis received between said end walls, with connector head means retained in said recesses and connector shanks passing through said openings that intersect said recesses,
   (d) certain of said through openings being forwardly elongated for adjustment of the shanks therein,
   (e) said recesses being forwardly elongated, the end walls being upright, and there being multiple of said recesses in each end wall, the multiple recesses vertically spaced apart,
   (f) and including brackets extending vertically over said recesses, and other holes through said end walls, and aligned with said brackets fastened to said end walls, said brackets also adapted for adjustable attachment to vehicle dash structure.

2. The improvement of claim 1 including fasteners projecting from the brackets through said other holes, the brackets being upright and having L-shape with flanges projecting away from said end walls for attachment to vehicle dash structure.

3. The improvement of claim 1 wherein said other holes are generally circular, the other holes in said end walls being spaced apart in at least one row that extends forwardly.

4. The improvement of claim 3 wherein there are two of said rows in each end wall, said end walls extending upright, the two rows of circular holes in each end wall being vertically spaced apart to form upper and lower rows.

5. The improvement of claim 4 wherein said brackets extend between said upper and lower rows of holes and are attached thereto via fasteners.

6. The improvement of claim 5 wherein each bracket has upper and lower locations at which there are two through apertures which are spaced apart in a forwardly extending row, the spacing of said apertures being different than the spacing of said holes, a selected one of said bracket apertures at an upper location being registered with a selected one of said holes in an upper row for reception of a fastener therethrough, and a selected one of said bracket apertures at a lower location being registered with a selected one of said holes in a lower row, for reception of a fastener therethrough.

7. The improvement of claim 5 wherein each bracket includes multiple tabs to be selectively usefully attached to vehicle dash structure, and remaining unselected and unused tabs carried by the bracket to be broken away.

8. The improvement of claim 7 including a wedge-shaped spacer adjacent a selected tab, for wedging between that tab and vehicle dash structure to which the tab is attachable.

9. The improvement of claim 8 wherein the walls have thickness less than 1/16 inch.

10. The improvement of claim 1 including an extension panel adjacent the frame front panel and attached thereto.

11. The improvement of claim 10 wherein the extension panel has rearwardly projecting cantilevered arms with tapered rearward ends, the arms adapted to bend as the tapered rearward ends thereof cam against portions of the front panel bounding an opening formed therein.

12. The improvement of claim 10 wherein the forward extension panel is integral with the frame front panel, and forms space for reception of a radio forward section.

13. The improvement of claim 1 including forwardly facing break-away means integral with the frame and associated with the front main panel, said break-away means forming forward through openings to pass shaft tuning means of a first radio having a chassis, the break-away means adapted to be broken away from the frame to provide a relatively large opening for alternate reception of a second radio chassis.

14. The improvement of claim 13 wherein the main front panel has a front face, and said break-away means comprises a thin wall or walls generally parallel to said front face but offset relative thereto.

15. The improvement of claim 14 wherein the main front panel defines a generally rectangular through opening for alternate reception of:
    (a) a radio equalizer chassis,
    (b) a molded plastic pocket.

16. The improvement of claim 13 including said first radio at least partly received by the frame, the shaft tuning means comprising two shafts passing through the openings in said break-away walls.

17. The improvement of claim 1 including factory brackets attached to said first-mentioned brackets, the factory brackets attached to the dash structure.

18. The improvement of claim 17 wherein said first-mentioned brackets have upper and lower rows of apertures to attach to the frame end walls via other upper and lower openings therein, via fasteners passing through registered openings and apertures at such upper and lower locations, there being bolts attaching the first-mentioned brackets to said factory brackets with the bolts having heads reserved in said end wall recesses.

* * * * *